(12) United States Patent
Bishop et al.

(10) Patent No.: US 9,914,184 B2
(45) Date of Patent: Mar. 13, 2018

(54) 3D FORMED LDS LINER AND METHOD OF MANUFACTURING LINER

(71) Applicants: TYCO ELECTRONICS CORPORATION, Berwyn, PA (US); Tyco Electronics AMP Korea Co., Ltd., Kyongsangbuk-Do (KR)

(72) Inventors: Bruce Bishop, Aptos, CA (US); Jung Hoon Kim, Gyeonggi-Do (KR); June Gun Park, Gyeonggi-do (KR)

(73) Assignees: TE Connectivity Corporation, Berwyn, PA (US); Tyco Electronics AMP Korea Co., Ltd. (KR)

( * ) Notice: Subject to any disclaimer, the term of this patent is extended or adjusted under 35 U.S.C. 154(b) by 332 days.

(21) Appl. No.: 14/873,821

(22) Filed: Oct. 2, 2015

(65) Prior Publication Data

US 2017/0095889 A1 Apr. 6, 2017

(51) Int. Cl.
| | |
|---|---|
| *H01Q 21/00* | (2006.01) |
| *H01Q 1/38* | (2006.01) |
| *H01Q 1/50* | (2006.01) |
| *H05K 3/10* | (2006.01) |
| *B23K 26/00* | (2014.01) |
| *B23K 26/351* | (2014.01) |
| *B23K 26/34* | (2014.01) |
| *H01Q 1/24* | (2006.01) |

(52) U.S. Cl.
CPC ........ *B23K 26/351* (2015.10); *B23K 26/0087* (2013.01); *B23K 26/34* (2013.01); *H01Q 1/243* (2013.01)

(58) Field of Classification Search
CPC ........ B23K 26/00; B23K 26/35; B23K 26/34; H01Q 21/00; H01Q 1/38; H01Q 1/50; H05K 3/10
USPC ........... 427/97.1, 97.2, 555; 216/13; 29/825, 29/846, 848, 829; 430/311; 219/121.68, 219/121.69
See application file for complete search history.

(56) References Cited

U.S. PATENT DOCUMENTS

| | | |
|---|---|---|
| 5,972,447 A | 10/1999 | Hata et al. |
| 6,396,444 B1 | 5/2002 | Goward et al. |
| 6,456,249 B1 | 9/2002 | Johnson et al. |
| 6,531,983 B1 | 3/2003 | Hirose et al. |
| 6,603,432 B2 | 8/2003 | Hill et al. |
| 6,778,139 B2 | 8/2004 | Suzuki et al. |
| 7,868,832 B2 | 1/2011 | Krishtul |

(Continued)

FOREIGN PATENT DOCUMENTS

| | | |
|---|---|---|
| EP | 1937039 A1 | 11/2007 |
| JP | 2007-274665 A | 10/2007 |

*Primary Examiner* — Samuel M Heinrich

(57) ABSTRACT

A method of manufacturing a 3D LDS liner includes providing an LDS sheet, forming 3D contoured liners in the LDS sheet, laser structuring circuit patterns on the 3D contoured liners to provide a laser structured circuit pattern, selectively plating the laser structured circuit patterns to form circuits on the 3D contoured liners, and removing the 3D contoured liners from the LDS sheet. A formed LDS liner includes a thin LDS film having a 3D contoured surface vacuum formed from an LDS sheet. The LDS film includes an inner surface and an outer surface. A laser structured circuit pattern is etched into the LDS film, and a conductive layer is selectively plated on the laser structured circuit pattern forming a circuit on the LDS film. The circuit may have a non-planar region.

20 Claims, 3 Drawing Sheets

(56) References Cited

U.S. PATENT DOCUMENTS

| | | |
|---|---|---|
| 8,680,402 B2 | 3/2014 | An et al. |
| 9,065,179 B2 | 6/2015 | Kimura et al. |
| 2004/0137950 A1 | 7/2004 | Bolin et al. |
| 2006/0001576 A1 | 1/2006 | Contopanagos |
| 2009/0067141 A1 | 3/2009 | Dabov et al. |
| 2009/0108985 A1 | 4/2009 | Haag et al. |
| 2009/0229108 A1 | 9/2009 | Shamblin et al. |
| 2009/0231206 A1 | 9/2009 | Shamlin et al. |
| 2012/0194404 A1 | 8/2012 | Arkko et al. |
| 2012/0235879 A1 | 9/2012 | Eder et al. |
| 2013/0088406 A1* | 4/2013 | Hamada .................. H01Q 1/36 343/893 |
| 2013/0234899 A1* | 9/2013 | Pope ..................... H01Q 1/243 343/702 |
| 2016/0363367 A1* | 12/2016 | Hitzelberger .......... C25D 5/024 |

* cited by examiner

3D FORMED LDS LINER AND METHOD OF MANUFACTURING LINER

BACKGROUND OF THE INVENTION

The subject matter herein relates generally to laser direct structuring (LDS) liners and methods of manufacturing LDS liners.

Internal antennas and conductive traces are used in electronic devices, such as mobile wireless devices including phones, laptops, and the like. The internal antennas or conductive traces can be integrated with a housing of the mobile wireless device. The antennas can be designed to cover various radio frequency (RF) bands for communication protocols, such as but not limited to the LTE (Long Term Evolution), GSM (Global System for Mobile) and UMTS (Universal Mobile Telecommunications System) cellular bands or Wi-Fi bands widely used in mobile phones and laptops.

Electronic devices are continuously becoming smaller, more compact, and more complex. Such changes can result in issues with electrical connectivity, manufacturing, and assembly. Producing antennas and conductive traces capable of operation on or with such electronic devices is, thus, becoming more difficult and/or more costly. In order to obtain the desired space for the integrated antenna and still keep the total product size small it is desirable to place the antenna or other conductive traces on the housing of the wireless device. This can be achieved with an antenna or conductive trace that is formed in a three dimensional (3D) shape fitting to the contours of the inside of the housing. Such structures are primarily realized by flexible circuit print (FCP) antennas, metal sheet antennas, and Laser Direct Structure (LDS) antennas. Other processes for producing such structures include screen printing, flexographic techniques, gravure-printing, spin-coating, and dip-coating. Each method has its strengths and weaknesses. Such processes may suffer from drawbacks of being limited to specific and/or simple geometries (for example, planar geometries), being very time consuming to achieve desired thicknesses, and being costly, due to the time-consuming production aspects.

LDS processes produce LDS parts having complex shapes and contours that may match the interior of the housing of the electronic device. Such LDS processes use a composite loaded with a laser-activated precursor that acts as a seed layer for selective plating. The composite can be molded into almost any shape, including three dimensional (3D) shapes. For example, the composite is manufactured into small particles that are injected into a mold. However, due to molding limitations, the LDS parts are limited in how thin such parts can be manufactured. For example, conventional 3D molded LDS manufacturing processes yield parts that have a minimum thickness of approximately 1.0 mm. The size of the particles, mechanical constraints and the molded LDS manufacturing processes do not allow manufacturing thinner molded parts.

A need remains for a process that is compatible with manufacturing thinner parts and reduce the space in the housing occupied by the LDS part.

BRIEF SUMMARY OF THE INVENTION

In one embodiment, a method of manufacturing a 3D LDS liner includes providing an LDS sheet, forming 3D contoured liners in the LDS sheet, laser structuring circuit patterns on the 3D contoured liners to provide laser structured circuit patterns, selectively plating the laser structured circuit patterns to form circuits on the 3D contoured liners, and removing the 3D contoured liners from the LDS sheet.

In another embodiment, a formed LDS liner is provided that includes a LDS film having a 3D contoured surface vacuum-formed from an LDS sheet. The LDS film includes an inner surface and an outer surface. A laser structured circuit pattern is etched into the LDS film and a conductive layer is selectively plated on the laser structured circuit pattern forming a circuit on the LDS film. The circuit has a non-planar region.

In a further embodiment, an electronic device includes a housing having a cavity with a contoured surface and a formed LDS liner received in the cavity against the contoured surface. The formed LDS liner includes a LDS film having a 3D contoured surface vacuum formed from an LDS sheet having an inner surface and an outer surface. The formed LDS liner includes a laser structured circuit pattern etched into the LDS film and a conductive layer selectively plated on the laser structured circuit pattern forming a circuit on the LDS film. The circuit has a non-planar region. The 3D contoured surface of the formed LDS liner is received in the cavity in registration with the contoured surface of the housing.

DETAILED DESCRIPTION OF SPECIFIC EMBODIMENTS OF THE INVENTION

Figure 1:
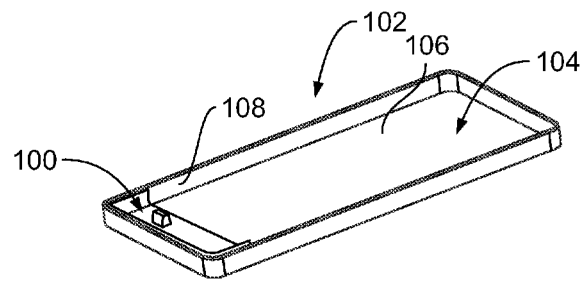
FIG. 1 illustrates a 3D formed laser direct structured (LDS) liner in accordance with an exemplary embodiment.

FIG. 1 illustrates a three dimensional (3D) formed laser direct structured (LDS) liner 100 in accordance with an exemplary embodiment. The LDS liner 100 is formed from a thin LDS sheet that is processed by forming a contoured 3D shape or structure, laser etching a circuit pattern onto the contoured 3D shape, and selectively plating the circuit pattern to form a "circuit" on the LDS liner 100. As described further below, "circuit pattern" may be any conductive pattern forming a "circuit" such as an electrical circuit, conductive layer, conductive traces, antenna, etc. The formed and circuit patterned LDS liner 100 is then removed from the LDS sheet and the individual LDS liner 100 may be inserted into an electronic device 102. For example, the LDS liner 100 may be received in a cavity 104 of a housing 106 of the electronic device 102. The housing 106 has a contoured surface 108 and the LDS liner 100 is received in the cavity 104 in registration with the contoured surface 108 of the housing 106. The LDS liner 100 is extremely thin and occupies very little space in the housing 106, which may allow additional room in the housing 106 for other components and/or may allow the overall size of the housing 106 of the electronic device 102 to be made smaller due to the thinner nature of the LDS liner 100, which is not constrained by molding manufacturing limitations.

Figure 2:
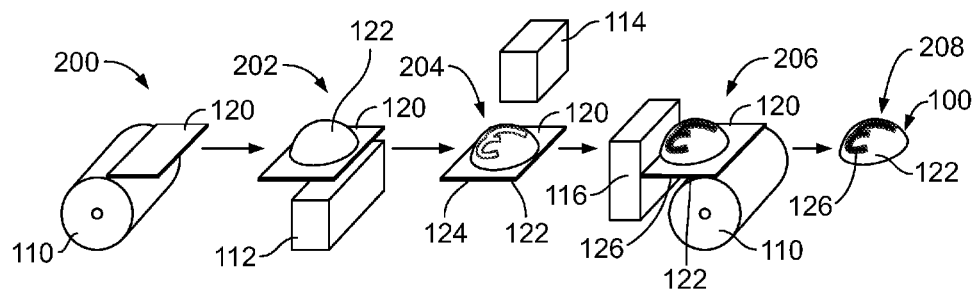
FIG. 2 illustrates a process of manufacturing a 3D formed LDS liner in accordance with an exemplary embodiment.

FIG. 2 illustrates a process of manufacturing a 3D formed LDS liner, such as the LDS liner 100. In an exemplary embodiment, the LDS liner 100 is formed by a continuous process where the LDS liners 100 are manufactured by a reel-to-reel process between reels 110. The LDS liners 100 may be continuously manufactured and individually removed from the LDS sheet, such as by a trimming process, to provide the individual LDS liners 100.

In an exemplary embodiment of the process, an LDS sheet 120 is provided at process step 200. The LDS sheet 120 may be preformed into the planar sheet shape by a known LDS manufacturing process. The LDS sheet 120 may be made thinner than currently known 3D contoured LDS parts, which are manufactured in molds and therefore are limited in how thin the molded parts are able to be manufactured. The non-3D or two-dimensional LDS sheet 120 is a thin sheet formed from an LDS-compliant material. The LDS-compliant material from which LDS sheet 120 is formed may be a thermoplastic material doped with an LDS activated material, such as a metallic oxide that can be activated by a laser. For example, the LDS sheet 120 may be manufactured from a composite material loaded with a laser activated precursor that, after activation by a laser, acts as a seed layer for selective plating to form a conductive layer in a particular circuit pattern. The LDS sheet 120 may be planar and have a uniform thickness. In an exemplary embodiment, the LDS sheet 120 may have a thickness less than 1.0 mm. The LDS sheet 120 has a thickness less than 0.5 mm. The LDS sheet 120 may have a thickness less than 0.3 mm. The LDS sheet 120 may have a thickness less than 0.1 mm.

In an exemplary embodiment of the process, the LDS sheet 120 is formed into a 3D shape at process step 202. A 3D contoured LDS film 122 is formed in the LDS sheet 120, and may be sequentially formed along the sheet to form multiple liners 100. The film 122 remains integral with the sheet 120 and may be conveyed with the sheet 120 between the reels 110 as part of the continuous processing. The film 122 may be individually formed along the sheet 120 with other films 122 or may be batch formed along the LDS sheet 120 with other films 122. The film 122 is a nonplanar structure having a contoured shape relative to the planar LDS sheet 120. In an exemplary embodiment, the 3D contoured film 122 is vacuum formed against a mold 112. Other processes may be used to form the film 122, such as thermoforming, high-pressure forming, and the like. The film 122 may have a complex shape. The film 122 may have one or more cavities, one or more raised portions, one or more protrusions, one or more openings, and the like. The film 122 may have one or more curved surfaces and may have one or more flat surfaces. The curved surfaces may be gradual curved surfaces or may be abrupt curved surfaces, such as corners between one or more other flat surfaces or curved surfaces. The film 122 may have an inner surface and an outer surface opposite the inner surface. The inner surface may be the surface that faces the mold used to form the film 122. In an exemplary embodiment, the film 122 is formed with a generally uniform thickness. The film 122 may have a thickness approximately equal to the thickness of the LDS sheet 120. Optionally, the film 122 may be thinned out during the forming process such that the film 122 has a thickness less than the thickness of the LDS sheet 120.

In an exemplary embodiment of the process, circuit patterns 124 are laser structured on the 3D contoured film 122 at process step 204. The circuit patterns 124 are etched into the 3D contoured film 122 by a laser 114. The laser 114 scribes or etches the desired circuit patterns 124 in desired areas of the film 122. For example, at the locations where the laser beam hits the LDS material of the film 122, the metal additive of the LDS material of the film 122 forms an ablated metal oxide-bearing trace. The circuit patterns 124 may be provided on the inner surface, on the outer surface, or on both the inner and outer surfaces of the film 122. The circuit patterns 124 may be provided on the nonplanar regions of the film 122. The circuit patterns 124 may be provided on curved surfaces of the film 122, along the edges of the film 122, along flat surfaces of the film 122, and the like. Optionally, the circuit patterns 124 may be provided on the flat portion of the LDS sheet 120 in the areas immediately around the film 122. When the formed film 122 is removed, the portion of the LDS sheet 120 including the circuit patterns may be additionally removed with the formed film 122 such that both the formed film and the removed portion of the LDS sheet 120 may be placed in the electronic device 102.

In an exemplary embodiment of the process, the circuit patterns 124 are selectively plated to form circuits 126 on the 3D contoured film 122 at process step 206. The circuit patterns 124 act as the foundation for the selective plating process. For example, the metal oxide particles act as the initiation sites for subsequent plating where the metal oxide particles contain sufficient electro-negative potential to initiate conductive material, such as copper, deposition. Other types of plating may be used in alternative embodiments. The plating may occur in a plating bath 116. The circuit patterns 124 form tracks in the desired pattern on the film 122 where successive layers of copper material or other metallic material may be added during the plating process. The circuits 126 may have a 3D shape as the circuits 126 span the contoured surfaces of the film 122. The circuits 126 may be any type of circuits. In an exemplary embodiment, the circuits 126 may form an antenna, such as a single band antenna circuit and/or a dual- or multi-band antenna circuit. The circuits may form signal traces and/or ground traces, which may be used to electrically connect one or more electrical components of the electronic device 102. The circuits 126 may form a touch sensor, a capacitive switch, sensor, or another type of active electronic device. The circuits 126 may form a shielding circuit for shielding other electrical components. Portions of the circuits 126 may form contact pads for interfacing with electrical contacts of other components, circuit boards and the like of the electronic device or bonding pads for interfacing with electrical wires or electrical contacts, such as at a soldered connection.

In an exemplary embodiment of the process, the film 122, with the circuits 126, may be removed from the LDS sheet 120 at process step 208 to form the 3D formed LDS liner 100. For example, the film 122 may be trimmed, cut, or otherwise separated from the LDS sheet 120 as the LDS sheet 120 is transferred from reel-to-reel. Once the liner 100 is separated from the LDS sheet 120, the liner 100 may be stored, shipped, or placed directly into the electronic device 102 during a further processing step.

The entire manufacturing process including forming, laser structuring, and metallization, is fast and flexible for circuit design changes. The manufacturing process forms a thin liner 100 having the integrated circuits 126 that may be directly placed into or on the electronic device 102. The 3D formed LDS liner 100 may be thinner than other known 3D LDS parts that are molded from LDS material into the desired 3-D shape because the LDS liner 100 is formed from the thin LDS sheet 120, such as by the vacuum forming process, and the thin LDS sheet can be manufactured to be thinner than conventionally molded LDS parts. The formed LDS liner 100 may have use in various applications such as automotive applications, consumer device applications, data communication applications, medical devices, portable electronic devices, telecommunication applications, and the like.

Figure 3:
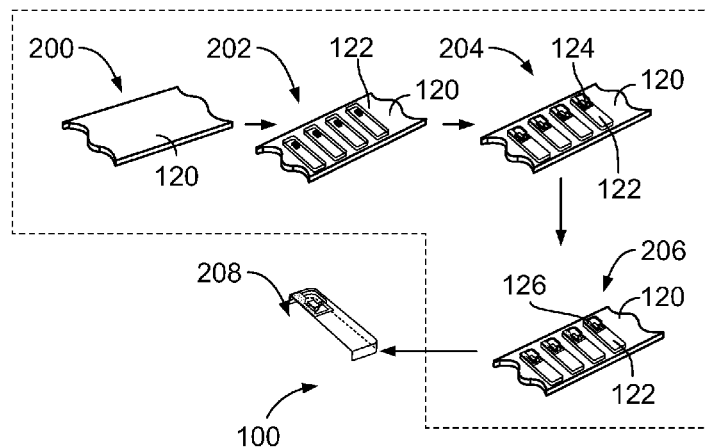
FIG. 3 illustrates a process of manufacturing a 3D formed LDS liner in accordance with an exemplary embodiment.
Figure 4:
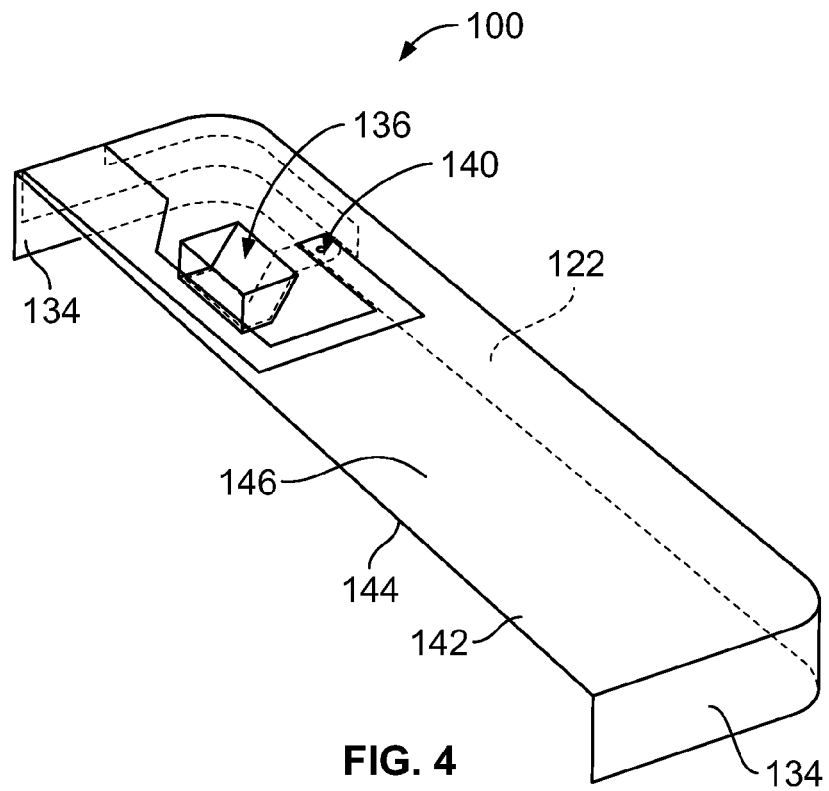
FIG. 4 is a bottom view of the 3D formed LDS liner in accordance with an exemplary embodiment.
Figure 5:
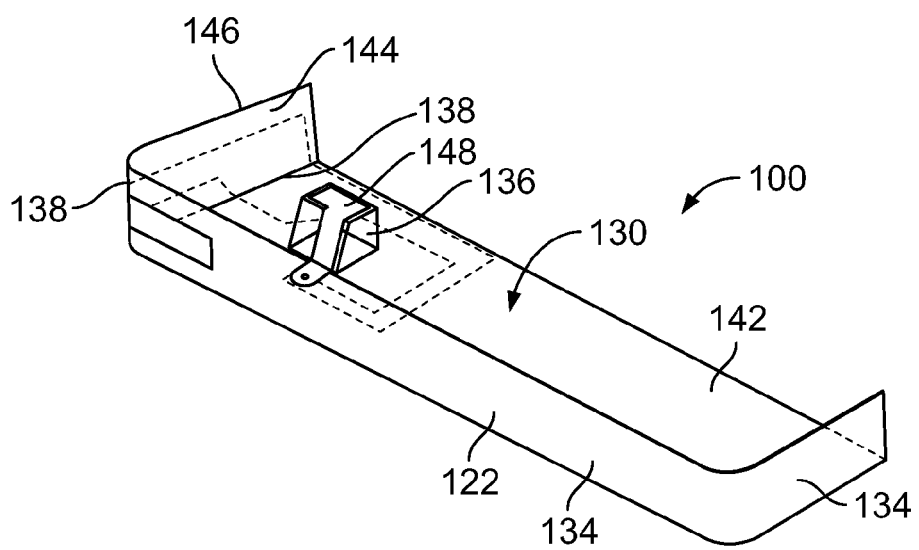
FIG. 5 is a top view of the 3D formed LDS liner in accordance with an exemplary embodiment.

FIG. 3 illustrates a process of manufacturing the 3D formed LDS liner 100 having a particular 3D shape and circuit structure for a particular application in accordance with another exemplary embodiment. FIG. 4 is a bottom view of the formed LDS liner 100 formed in accordance with an exemplary embodiment. FIG. 5 is a top view of the formed LDS liner 100 formed in accordance with an exemplary embodiment. The process of manufacturing may be used to manufacture liners 100 having other shapes and/or other circuit patterns in alternative embodiments, as evidenced by the embodiment illustrated in FIG. 2 showing a generic shape and generic circuit pattern compared to the more particular shape and circuit pattern shown in FIG. 3.

The LDS sheet 120 is provided at process step 200. The LDS sheet 120 may be preformed into the thin, planar sheet shape formed from an LDS-compliant material loaded with a laser activated precursor that, after activation by a laser, acts as a seed layer for selective plating. The LDS sheet 120 may be planar and have a uniform thickness. In an exemplary embodiment, the LDS sheet 120 may have a thickness less than 1.0 mm. The LDS sheet 120 has a thickness less than 0.5 mm. The LDS sheet 120 may have a thickness less than 0.3 mm. The LDS sheet 120 may have a thickness less than 0.1 mm.

The LDS sheet 120 is formed into a 3D shape at process step 202 to form the 3D contoured LDS films 122 out of the LDS sheet 120. The films 122 remain integral with the sheet 120 and may be conveyed with the sheet 120 between the reels (shown in FIG. 2) as part of the continuous processing. The films 122 are nonplanar structures having contoured shapes relative to the planar LDS sheet 120. In an exemplary embodiment, the 3D contoured films 122 are vacuum formed against a mold (shown in FIG. 2). Other processes may be used to form the film 122, such as thermoforming, high-pressure forming, and the like. The films 122 may have a complex shape. With reference to FIGS. 4 and 5, in the illustrated embodiment, the film 122 has a pocket 130 (on the back side), raised portions defining walls 134 and a protrusion 136, and may have one or more openings such as the opening to the pocket 130 and/or openings that define through-holes 140 through the film 122. The film 122 may have one or more curved surfaces such as corners 138 and may have one or more flat surfaces, such as a base 142. The film 122 has an inner surface 144 and an outer surface 146 opposite the inner surface 144. The inner surface 144 may be the surface that faces the mold used to form the film 122.

The circuit patterns 124 are laser structured on the 3D contoured film 122 at process step 204 by a laser (shown in FIG. 2). At the locations where the laser beam hits the LDS material of the film 122, the metal additive of the LDS material of the film 122 forms an ablated metal oxide bearing trace. In the illustrated embodiment, the circuit patterns 124 are provided on the inner surface 144 and on the outer surface 146; however the circuit patterns may be provided on only the inner surface 144 or lonely the outer surface 146 in alternative embodiments. The circuit patterns 124 span the walls 134, the corners 138 the curved surfaces, the base 142 and the protrusion 136 in the illustrated embodiment. Optionally, the circuit patterns 124 may be provided on the flat portion of the LDS sheet 120 in the areas immediately around the film 122. When the formed film 122 is removed, the portion of the LDS sheet 120 including the circuit patterns may be additionally removed with the formed film 122 such that both the formed film and the removed portion of the LDS sheet 120 may be placed in the electronic device 102.

The circuit patterns 124 are selectively plated to form the circuits 126 on the 3D contoured film 122 at process step 206, which may occur in a plating bath (shown in FIG. 2). The circuits 126 have a 3D shape as the circuits 126 span the contoured surfaces of the film 122. In an exemplary embodiment, the circuits 126 form an antenna circuit. Portions of the circuits 126 form contact pads 148 for interfacing with electrical contacts of other components of the electronic device 102. In the illustrated embodiment, as noted above, the circuits 126 are provided on both the inner surface 144 and the outer surface 146 of film 122. For example, the contact pad 148 is provided on the inner surface 144 and the antenna circuit is provided, generally, on the outer surface 146. The through-hole 140 is plated and defines a plated through-hole that electrically couples the circuits 126 on the inner surface 144 and the circuits 126 on the outer surface 146. The contact pad 148 may be provided at least in part, on the protrusion 136 and is thus elevated from the base 142 for electrical connection to the corresponding contact, circuit or wire of the component within the electronic device 102.

In alternative embodiments, rather than having the plated through-hole 140, the circuits 126 on the inner and outer surfaces 144, 146 may be electrically coupled by capacitively coupling the circuits 126. For example, the circuits 126 may have overlap regions that are capacitively coupled. An amount or length of overlap may control an amount of capacitive coupling and thus a frequency of operation or other characteristics of the circuits 126. Having the circuits 126 capacitively coupled reduces the need for precisely aligning the film 122 for laser structuring and/or the need for multiple lasers or multiple laser structuring steps. The circuits 126 may be electrically coupled by other types of coupling in alternative embodiments. In other various embodiments, rather than having the circuits 126 on both surfaces 144, 146, the circuits 126 are provided either on the inner surface 144 or the outer surface 146, thus eliminating the need for laser registration and/or capacitive coupling.

The film 122, with the circuits 126, is removed from the LDS sheet 120 at process step 208 to form the 3D formed LDS liner 100. For example, the film 122 may be trimmed, cut, or otherwise separated from the LDS sheet 120 as the LDS sheet 120 is transferred from reel-to-reel. Once the liner 100 is separated from the LDS sheet 120, the liner 100 may be stored, shipped, or placed directly into the electronic device 102 during a further processing step.

Figure 6:
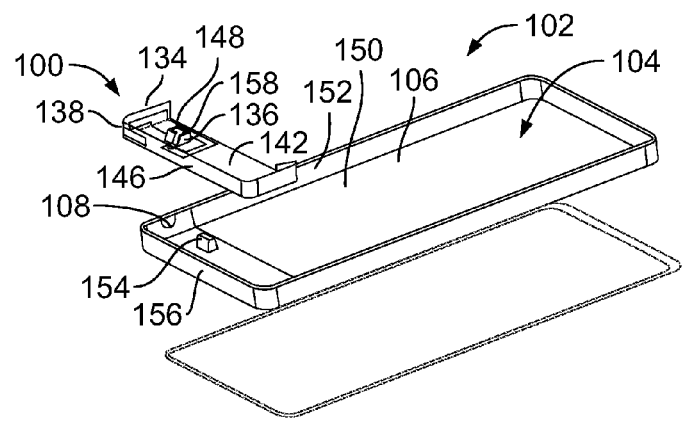
FIG. 6 illustrates the 3D formed LDS liner 100 being loaded into an electronic device.
Figure 7:
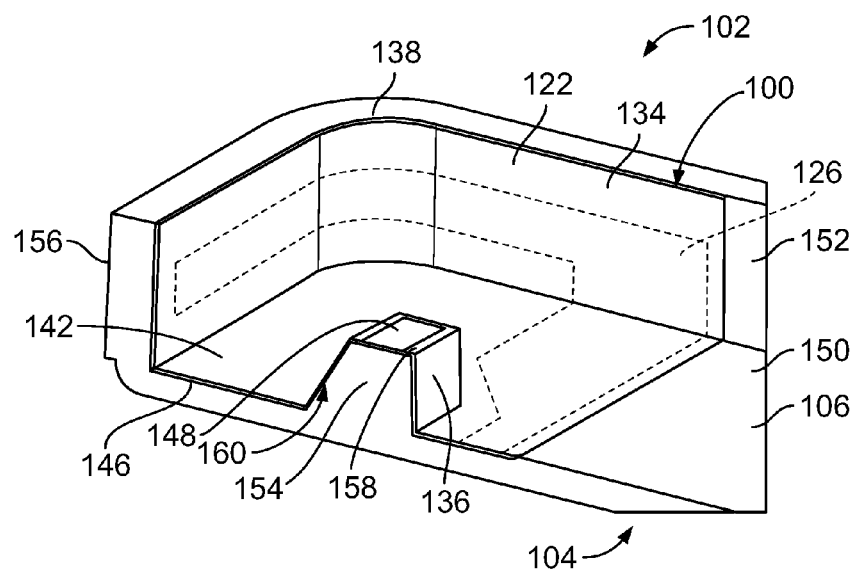
FIG. 7 is a cross-sectional view of the 3D formed LDS liner loaded into the electronic device.

FIG. 6 illustrates the 3D formed LDS liner 100 being loaded into the electronic device 102. FIG. 7 is a cross-sectional perspective view of the formed LDS liner 100 loaded into the electronic device 102.

The LDS liner 100 is loaded into the cavity 104 of the housing 106. The LDS liner 100 has a 3D contoured surface that closely matches the 3D contoured surface 108 of the housing 106. As such, the LDS liner 100 is received in the cavity 104 and registered with the contoured surface 108 of the housing 106. The antenna circuits 126 are provided along the LDS liner 122, such as along the outer surface 146 in the circuit pattern. While the circuits 126 are illustrated as being an antenna circuit, other types of circuits 126 may be used in alternative embodiments, such as data transmission circuits between various components of the electronic device, switch or sensor circuits, or other types of circuits.

The contact pads 148 provide connection points between the circuits 126 and the other various electronic components of the electronic device 102.

In the illustrated embodiment, the housing 106 is a rear housing or shell of a mobile electronic device, such as a mobile phone. The housing 106 includes a back wall 150 and sidewalls 152 that define the cavity 104. The housing 106 includes a protrusion 154 extending from the back wall 150 into the cavity 104. The protrusion 154 is located near one of the corners of the sidewalls 152, such as near a top 156 of the housing 106.

The LDS liner 100 is loaded into the cavity 104 at the top 156 of the housing 106 such that the outer surface 146 faces the housing 106. The protrusion 136 is aligned with the protrusion 154 and the protrusion 154 is loaded into the cavity or space defined by the protrusion 136. A cap 158 of the protrusion 136 rests on the protrusion 154 such that the contact pad 148, on the cap 158 is supported by the protrusion 154. The base 142 of the liner 100 rests on the back wall 150. The walls 134 of the liner 100 rest against the sidewalls 152 of the housing 106. The corners 138 closely follow the corners of the sidewalls 152 of the housing 106. The LDS liner 100 is very thin and occupies very little space in the cavity 104 of the housing 106. For example, in the illustrated embodiment, the LDS liner 100 is approximately 0.1 mm thick. The sidewalls 152 are much thicker than the LDS liner 100 and in the illustrated embodiment are approximately 10 times thicker than the LDS liner 100 at 1.0 mm thick. As noted above, conventional 3D molded LDS parts are unable to achieve the levels of thinness of the LDS liner 100, and rather are on the order of thickness of the sidewalls 152 or minimally approximately 1.0 mm thick. By using the thin LDS liner 100, as opposed to 3D molded LDS parts, more space is available within the cavity 104 other electrical components of the electronic device 102 and/or the overall size of the housing 106 may be reduced making the electronic device 102 smaller.

Optionally, the housing 106 may have a pocket 160 formed in the back wall 150 and/or the sidewalls 152 that receives the liner 100 such that the interior of the liner is generally flush with the interior of the housing 106. In other various embodiments, the liner 100 may be received in a pocket formed in an interior portion of the sidewalls 152 and/or back wall 150. For example, the housing 106 may be molded around the liner 100. In other various embodiments, the liner 100 may be provided on an exterior surface of the housing 106 rather than the interior surface of the housing 106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A method of manufacturing a 3D LDS liner, the method comprising:
   providing an LDS sheet;
   forming 3D contoured liners in the LDS sheet;
   laser structuring circuit patterns on the 3D contoured liners to provide laser structured circuit patterns;
   selectively plating the laser structured circuit patterns to form circuits on the 3D contoured liners; and
   removing the 3D contoured liners from the LDS sheet.

2. The method of claim 1, further comprising placing the 3D contoured liners in corresponding electronic devices such that the liners closely follow 3D contoured surfaces of the electronic devices.

3. The method of claim 1, wherein said providing an LDS sheet comprises providing an LDS sheet having a thickness less than 0.3 mm.

4. The method of claim 1, wherein said forming 3D contoured liners comprises forming the planar LDS sheet into non-planar liners.

5. The method of claim 1, wherein said forming the 3D contoured liners comprises vacuum forming the liners.

6. The method of claim 1, wherein said laser structuring circuit patterns comprises laser structuring circuit patterns on both an inner surface of the liner and an outer surface of the liner.

7. The method of claim 6, wherein said selectively plating the laser structured circuit patterns comprises plating the laser structured circuit patterns on both the inner surface and the outer surface to form circuits on both the inner surface and the outer surface.

8. The method of claim 7, further comprising electrically coupling the circuits on the inner and outer surfaces by plated through holes through the liner.

9. The method of claim 7, further comprising electrically coupling the circuits on the inner and outer surfaces by capacitively coupling the circuits.

10. The method of claim 1, wherein said providing an LDS sheet comprises providing the LDS sheet between reels, said method further comprising continuously processing the LDS sheet.

11. A formed LDS liner comprising:
   a LDS film having a 3D contoured surface vacuum formed from an LDS sheet, the LDS film including an inner surface and an outer surface,
   a laser structured circuit pattern etched into at least one of the inner surface and the outer surface of the LDS film;
   a conductive layer selectively plated on the laser structured circuit pattern forming a circuit on the LDS film, the circuit having a non-planar region.

12. The formed LDS liner of claim 11, wherein the LDS film has a uniform thickness less than 1.0 mm.

13. The formed LDS liner of claim 11, wherein the LDS film is formed from an LDS sheet having a thickness less than 0.3 mm.

14. The formed LDS liner of claim 11, wherein the LDS film includes a pocket including a base and a wall extending away from the base, the laser structured circuit pattern and the circuit being formed on both the base and the wall.

15. The formed LDS liner of claim 11, wherein the laser structured circuit pattern and the circuit are formed on both the inner surface and the outer surface.

16. The formed LDS liner of claim 15, wherein the circuits on the inner and outer surfaces are electrically coupled by plated through holes through the LDS film.

17. The formed LDS liner of claim 15, wherein the circuits on the inner and outer surfaces are electrically coupled by capacitively coupling the circuits on the inner and outer surfaces.

18. The formed LDS liner of claim 11, wherein the laser structured circuit pattern forms an antenna pattern, the conductive layer forming an antenna circuit.

19. The formed LDS liner of claim 11, wherein the LDS film includes a pocket including a base and a wall extending away from the base, the LDS film including a protrusion in the pocket extending away from the base, the circuit being formed on the protrusion, the base and the wall, the portion of the circuit on the protrusion forming a contact pad for connecting to an electrical component.

20. An electronic device comprising:
a housing having a cavity with a contoured surface;
a formed LDS liner received in the cavity against the contoured surface, the formed LDS liner comprising a LDS film having a 3D contoured surface vacuum formed from an LDS sheet, the LDS film including an inner surface and an outer surface, the formed LDS liner comprising a laser structured circuit pattern etched into the LDS film, and the formed LDS liner comprising a conductive layer selectively plated on the laser structured circuit pattern forming a circuit on the LDS film, the circuit having a non-planar region, the 3D contoured surface of the formed LDS liner being received in the cavity in registration with the contoured surface of the housing.

* * * * *